United States Patent [19]

Clouse

[11] Patent Number: 4,527,825
[45] Date of Patent: Jul. 9, 1985

[54] FUEL FILLER DOOR WITH DUAL HINGE

[75] Inventor: Clarence Clouse, Ferndale, Mich.

[73] Assignee: General Motors Corporation, Detroit, Mich.

[21] Appl. No.: 552,704

[22] Filed: Nov. 17, 1983

[51] Int. Cl.³ .............................................. B60J 9/00
[52] U.S. Cl. ..................................... 296/1 C; 16/287; 16/297; 16/302; 16/371; 220/336; 220/337
[58] Field of Search ................. 296/1 C; 16/297, 302, 16/366, 371, 374, 287; 220/336, 337

[56] References Cited

U.S. PATENT DOCUMENTS

| 2,513,751 | 7/1950 | Semar | 16/85 |
| 2,732,582 | 1/1956 | Poe | 16/179 |
| 2,749,167 | 6/1956 | Cove | 16/302 X |
| 3,008,754 | 11/1961 | Fiala | 296/1 C |
| 4,406,379 | 9/1983 | Anderson et al. | 220/335 |

FOREIGN PATENT DOCUMENTS

| 535411 | 1/1957 | Canada | 16/302 |
| 2520472 | 11/1975 | Fed. Rep. of Germany | 16/366 |
| 2039323 | 8/1980 | United Kingdom | 16/366 |
| 2041070 | 9/1980 | United Kingdom | 296/1 C |

Primary Examiner—Robert B. Reeves
Assistant Examiner—Russell D. Stormer
Attorney, Agent, or Firm—Charles E. Leahy

[57] ABSTRACT

A motor vehicle body has a fuel filler neck accessible through a flanged opening in a vehicle body panel and concealed by a door adapted to fit within the opening flush with the vehicle body panel. The door is mounted by a gooseneck hinge bracket having a first end which is mounted on the vehicle body by a main pivot defining a hinge axis located beyond the edge of the door, and having an associated main spring which urges the hinge bracket to a normal position closing the door. The other end of the hinge bracket is connected to the door by an auxiliary pivot having an associated stop which limits pivotal movement of the door relative to the hinge bracket and an associated spring which normally urges the door to the closed position. Depressing the edge portion of the door causes the door to pivot about the auxiliary pivot to an extent permitted by the stop. The other end of the door is then gripped and pulled outwardly to initiate outward movement of the gooseneck hinge bracket about the main pivot until the main spring goes overcenter to hold the hinge bracket in the door open position.

3 Claims, 4 Drawing Figures

FUEL FILLER DOOR WITH DUAL HINGE

The invention relates to a hinge for a fuel filler door and more particularly provides a dual hinge arrangement which permits the door to be opened by pressing inwardly on an edge of the door.

BACKGROUND OF THE INVENTION

It is well known in motor vehicle bodies to mount the fuel filler neck within a flanged opening of the vehicle body rear quarter panel. A door is provided to fit within the opening flush with the body panel to conceal the fuel filler neck.

A preferred arrangement for hinging the fuel filler door includes a gooseneck hinge bracket which extends beyond the confines of the door and is hinged to the vehicle body at a distance from the flanged opening. Accordingly, when the door is pivoted to the open position, the gooseneck hinge bracket establishes an open position in which the door is located beyond the confines of the flanged opening to avoid any interference between the fuel fill nozzle and the hinge or the door. An overcenter spring is associated with the hinge and acts between the vehicle body and the gooseneck hinge bracket to selectively bias the fuel filler door to either the open or closed positions. A shortcoming of the aforedescribed prior art hinge construction is that a finger depression must be provided in either the quarter panel or the door opposite from the hinge in order to enable the gripping of the door to move the door to the open position.

The prior art has also recognized that the fuel filler door can be mounted on a hinge pin defining a hinge axis which is located within the confines of the door. Accordingly the door is opened by pressing inwardly on the end of the door adjacent the hinge axis so that the other end of the door pops open to be gripped for moving the door to the open position. A shortcoming of this type hinge arrangement is that the end of the door which is pressed inwardly requires that a substantial space be provided inwardly of the door to receive and store that end portion of the door. Furthermore, the presence of the door as well as the hinge and the associated spring for holding the door in the open and closed positions may somewhat obstruct the entry of the fuel fill nozzle.

It would be desirable to provide a fuel filler door construction having the advantages of both the above-described prior art hinge constructions. More particularly it would be desirable to provide a fuel filler hinge construction in which the door is mounted by a gooseneck hinge bracket so that the door is fully outside the body panel opening when the door is in the open position and yet the door can be opened by pressing inwardly on a margin of the door to thereby eliminating need for any finger grip depression in the door or the quarter panel.

SUMMARY OF THE INVENTION

According to the invention, a motor vehicle body has a fuel filler neck accessible through a flanged opening in a vehicle body panel and concealed by a door adapted to fit within the opening flush with the vehicle body panel. The door is mounted by a gooseneck hinge bracket having a first end which is mounted on the vehicle body by a main pivot defining a hinge axis located beyond the edge of the door, and having an associated main spring which urges the hinge bracket to a normal position closing the door. The other end of the hinge bracket is connected to the door by an auxiliary pivot having an associated stop which limits pivotal movement of the door relative to the hinge bracket and an associated spring which normally urges the door to the closed position. Depressing the edge portion of the door causes the door to pivot about the auxiliary pivot to an extent permitted by the stop. The other end of the door is then gripped and pulled outwardly to initiate outward movement of the gooseneck hinge bracket about the main pivot until the main spring goes overcenter to hold the hinge bracket in the door open position.

DESCRIPTION OF THE DRAWINGS

These and other objects, features and advantages of the invention will become apparent upon consideration of the specification and the appended drawings in which.

DESCRIPTION OF THE PREFERRED EMBODIMENT

Figure 1:
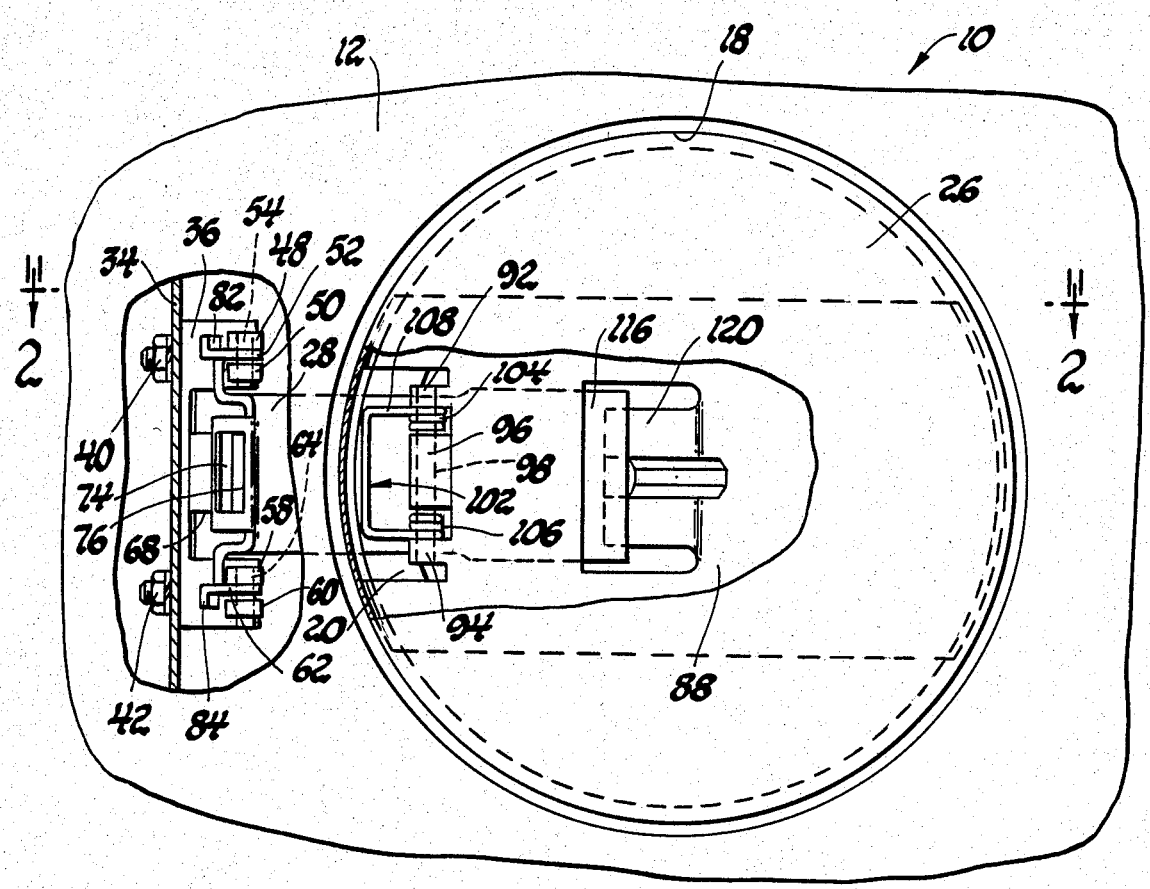
FIG. 1 is a side elevation view of the fuel filler door and dual hinge construction with parts broken away.
Figure 2:
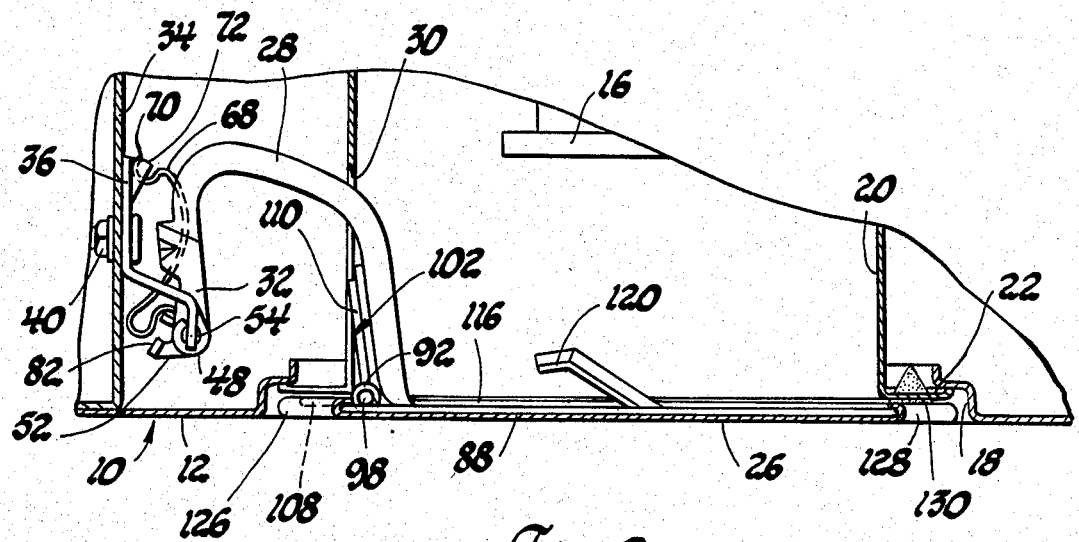
FIG. 2 is a sectional view taken in the direction of FIGS. 2—2 of FIG. 1.

Referring to FIGS. 1 and 2 there is shown a vehicle body 10 having a rear quarter panel 12. A fuel filler neck 16 is recessed behind the quarter panel 12 and is accessible through a circular flanged opening 18. Circular housing 20 surrounds the filler neck 16 and has a peripheral lip 22 which rests upon the flange of the flanged opening 18. A fuel filler door 26, also circular, fits within the flanged opening 18 and is flush with the surface of the rear quarter panel 12.

The door 26 is mounted on the vehicle body 10 by a gooseneck hinge bracket 28. The gooseneck hinge bracket 28 extends through an opening 30 in the housing 20 and has an inner end 32 which is pivotally mounted on a wall 34 of the vehicle body by a mounting bracket 36. The mounting bracket 36 is attached to the wall 34 by a pair of nut and bolt assemblies 40 and 42. As best seen in FIG. 4 the mounting bracket 36 has an upper pair of vertically spaced curls 48 and 50 which are spaced apart to receive an upper pivot arm 52 of the gooseneck hinge bracket 28. The curls 48 and 50 and the pivot arm 52 have aligned apertures which receive a pivot pin 54. The mounting bracket 36 also has a lower pair of curls 58 and 60 which are spaced apart to receive a pivot arm 62 of the gooseneck hinge bracket 28. The curls 58 and 60 and the pivot arm 62 have aligned apertures which receive a pivot pin 64. Thus, the pivot pins 54 and 64 mount the gooseneck hinge bracket 28 for movement between the solid line indicated position of FIG. 3 and the phantom indicated position of FIG. 3.

A leaf spring 68 has an anchor end 70 which is engaged in a spring seat 72 of the mounting bracket 36. The other end 74 of the leaf spring 68 engages within a slot 76 of the gooseneck hinge bracket 28. As best seen by reference to FIG. 2, whenever the door 26 is in the closed position the leaf spring 68 urges the gooseneck hinge bracket 28 in the direction to maintain the door in the closed position. As best seen by reference to FIG. 3, movement of the gooseneck bracket 28 and the door 26 to the phantom line indicated open position moves the leaf spring 68 overcenter with respect to the pivot axis defined by the pivot pins 54 and 64 so that the leaf spring 68 holds the door in the open position. The pivot arms 52 and 62 of the gooseneck hinge bracket 28 respectively have stop surfaces 82 and 84 which abut against the mounting bracket 36 as shown in FIG. 3 to stop the gooseneck hinge bracket 28 against further movement in the open direction.

The door 26 is connected to the gooseneck bracket 28 by an auxiliary hinge. As best seen in FIGS. 2 and 4 the door 26 includes a backing plate 88 having a pair of vertically spaced apart curls 92 and 94. A curl 96 on the gooseneck bracket 28 is interleaved between the backing plate curls 92 and 94 and has an opening which aligns with openings in the backing plate curls 92 and 94 to receive a pivot pin 98. A torsion spring 102 is associated with the auxiliary pivot and includes a pair of coils 104 and 106 which seat around the pivot pin 98. A leg 108 of the torsion spring bears against the door 26 while a pair of free ends 110 and 112 bear against the gooseneck bracket 28. As best seen in FIG. 2, the torsion spring 102 urges pivotal movement of the backing plate 88 into engagement with an abutment 116 of the gooseneck hinge bracket 28. As best seen in FIGS. 2 and 4, a stop tab 120 is bent outwardly from the backing plate 88 and surrounds the abutment 116.

Referring to FIG. 2, it is seen that the door 26 is normally established in the closed position. The leaf spring 68 urges the gooseneck hinge bracket 28 to its closed position of FIG. 2. Simultaneously the torsion spring 102 associated with the auxiliary pivot urges the door 26 to the closed position in which the door backing plate 88 engages against the abutment 116 of the gooseneck bracket 28.

Figure 3:
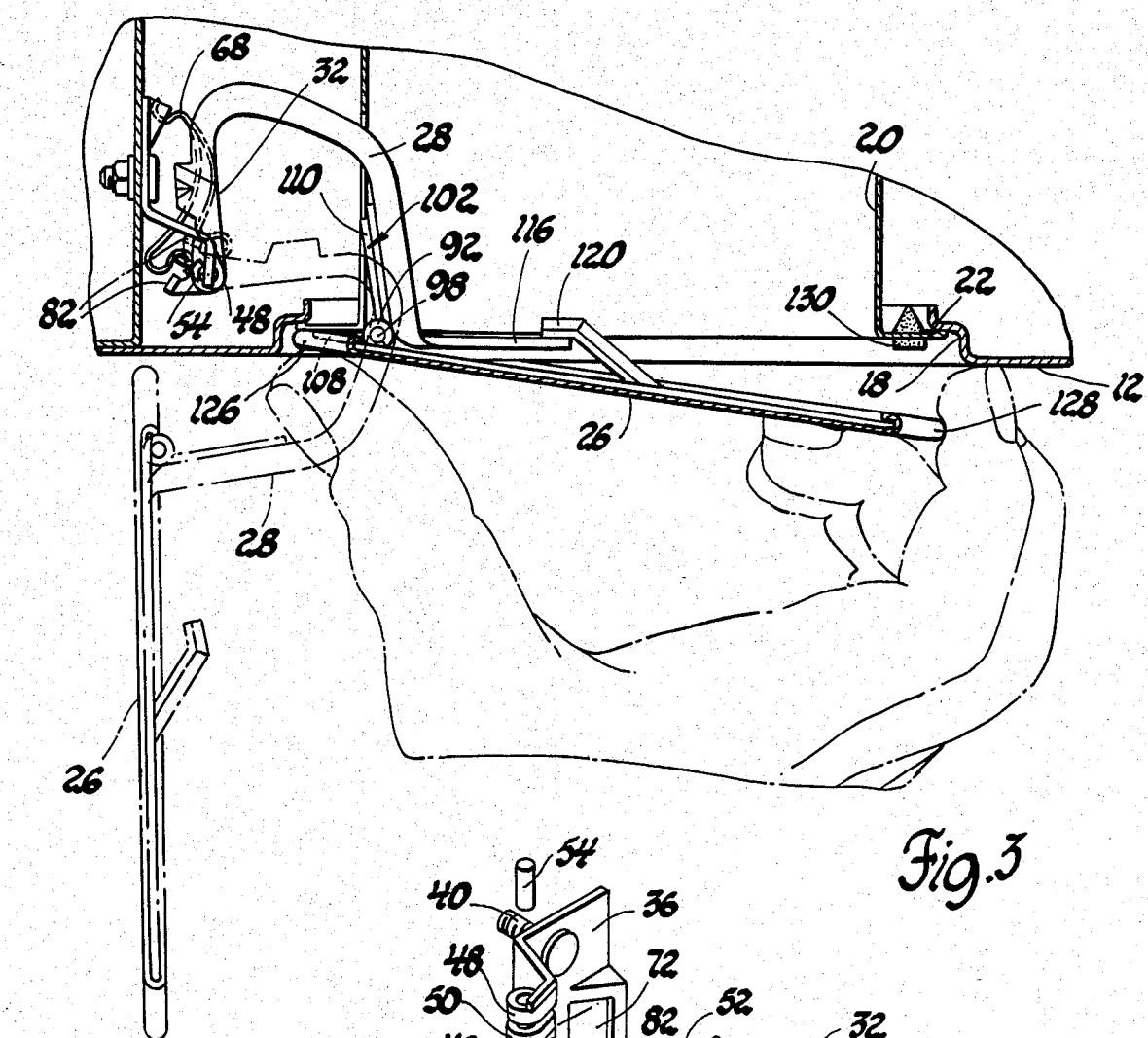
FIG. 3 is a view similar to FIG. 2 but showing the manner in which the door is opened.
Figure 4:
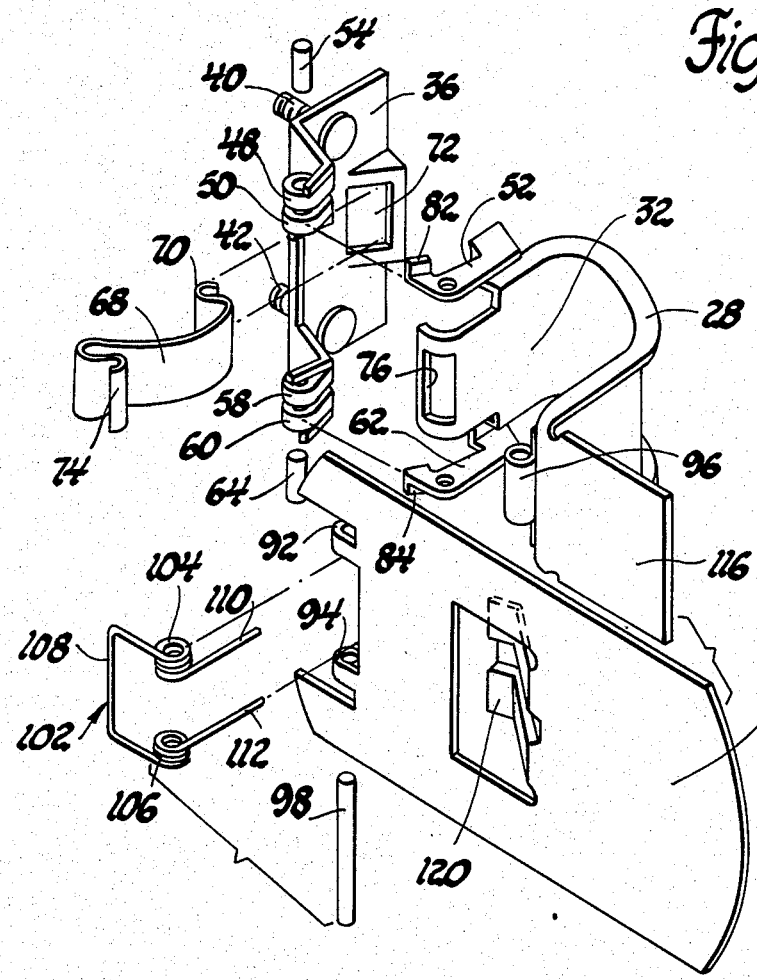
FIG. 4 is an exploded view showing the dual hinge construction.

Referring to FIG. 3, the opening movement of the door is initiated by the pressing on the edge portion 126 of the door which extends beyond the auxiliary hinge axis defined by the pivot pin 98. Accordingly, the door 26 is popped open to the position of FIG. 3 in which the stop 120 engages against the abutment 116 of the gooseneck hinge bracket 28. Further opening movement of the door 26 is obtained by gripping the end 128 of the door opposite the depressed edge portion 126 and then lifting the door 26 away from the quarter panel 12. This further opening movement of the door 26 to the phantom line indicated position of FIG. 3 is enabled by the pivotal movement of the gooseneck bracket 28 about the main hinge axis defined by pivot pins 54 and 64. The end 74 of the spring 68 goes overcenter with respect to the main pivot axis so that the effort of the leaf spring 68 acts to hold the gooseneck bracket 28 in the door open phantom line indicated position of FIG. 3.

The door is returned to the closed position by simply pushing the door 26 sufficiently to rotate the gooseneck bracket 28 and return the leaf spring 68 overcenter so that the leaf spring will snap the door closed. The end 128 of the door engages against a rubber cushion 130 provided in the flanged opening 18.

Thus it is seen that the invention provides a new and improved hinge construction for a fuel filler door. More particularly, it is appreciated that the main hinge axis defined by the pins 54 and 64 is located on the opposite side of the housing 20 and outside the confines of the flanged opening 18 and the door 26 so that the hinge is only a minimal obstruction to entry of the fuel filler nozzle into the fuel filler neck 16. This is best represented in the phantom line indicated door open position of FIG. 3 in which it is seen that only a portion of the gooseneck bracket 28 projects into the path of nozzle entry. Furthermore it is appreciated that a finger grip depression is not required in either the quarter panel 12 or the door 26. The location of the auxiliary pivot axis defined by the pivot pin 98 is sufficiently spaced from the edge portion 126 of the door to permit the door to be popped open to its solid line indication of FIG. 3 by merely pressing on the edge portion 126 of the door.

Furthermore, it is best seen in the phantom indicated open position of FIG. 3 that the gooseneck hinge bracket 28 functions to establish an open position of the door 26 at a location which is sufficiently clear of the opening to provide a substantially clear path of entry for the fuel fill nozzle.

The invention has been disclosed herein primarily in terms of the preferred embodiment shown in the drawings. However the invention is not intended to be limited thereto but rather only to the extent set forth in the appended claims.

The embodiments of the invention in which an exclusive property or privilege is claimed are defined as follows:

1. In a vehicle body having a fuel filler neck mounted within a flanged opening of a vehicle body panel and a door adapted to fit within the opening flush with the vehicle body panel, a hinge construction mounting the door for movement between a closed position in flush fitting relationship with the vehicle body panel to cover the filler neck and an open position uncovering the opening for access to the fuel filler neck comprising:

a hinge bracket having one end connected to the vehicle body and the other end connected to the door;

main pivot means connecting the hinge bracket and the vehicle body and having associated spring means urging the hinge bracket in the direction to close the door;

auxiliary pivot means connecting the hinge bracket with the door and having associated spring means urging the door to the closed position and stop means acting to limit the pivotal movement of the door relative the hinge bracket; and said auxiliary pivot means being located at a spaced relationship from one edge of the door so that inward pressing of that one edge of the door pivots the door about the auxiliary pivot means to open the other end of the door a limited distance defined by the stop means to enable finger gripping of the other end of the door for a subsequent further pivotal movement of the door and hinge bracket about the main pivot means to open the door.

2. In a vehicle body having a fuel filler neck mounted within flanged opening of a vehicle body panel and a door adapted to fit within the opening flush with the vehicle body panel, a hinge construction mounting the door for movement between a closed position in flushed fitting relationship with the vehicle body panel to cover the filler neck and an open position uncovering the opening for access to the fuel filler neck comprising:

a hinge bracket;

main pivot means acting between the hinge bracket and the vehicle body to enable pivotal movement of the hinge bracket relative to the vehicle body;

a main spring acting between the vehicle body and the hinge bracket to urge the hinge bracket to a position closing the door;

an auxiliary pivot means acting between the hinge bracket and the door to enable pivotal movement of the door relative the hinge bracket;

stop means acting to limit the pivotal movement on the door relative the hinge bracket;

an auxiliary spring acting between the hinge bracket and the door and acting to urge the door to a door closed position relative the hinge bracket; and said auxiliary pivot means being located at a spaced relationship from one edge of the door so that an inward pressing of that one edge of the door pivots the cover about the auxiliary pivot means to pop open the other end of the door a limited distance defined by the stop means to enable finger gripping of the other end of the door.

3. In a vehicle body having a fuel filler neck mounted within a flanged opening of a vehicle body panel and a door adapted to fit within the confines of flanged opening and flush with the vehicle body panel, a hinge construction mounting the door for movement between a closed position in flush fitting relationship with the vehicle body panel to cover the filler neck and an open position in which the cover is moved outside the opening to enable access to the fuel filler neck comprising:

a gooseneck-shaped hinge bracket having a first end extending within the confines of the flanged opening for connection with the door and a second end extending beyond the confines of the flanged opening and adapted for attachment to the vehicle body behind the vehicle body panel;

main pivot means connecting the second end of the hinge bracket on the vehicle body panel outside the confines of the flanged opening to enable pivotal movement of the hinge bracket outwardly of the opening to a position in which the first end of the hinge bracket is positioned outside the confines of the flanged opening;

auxiliary pivot means connecting the door with the first end of the hinge bracket, said auxiliary pivot means providing a hinge axis spaced from that edge portion of the cover closest to the main pivot means so that inward pressing of that edge portion of the door closest the main pivot means causes pivotal movement of the door about the auxiliary pivot means to pop open the other end of the door furthest from the main pivot means; and pivot limiting means acting between the door and the hinge bracket to limit pivotal movement of the door about the auxiliary pivot means so that a further pivotal movement of the door causes unitary pivotal movement of the door and the hinge bracket about the main pivot means to establish the door in the open position outside the confines of the flanged opening.

* * * * *